Feb. 6, 1951 — H. C. GLITSCH — 2,540,781
WEDGE ACTUATED C CLAMP
Filed Sept. 20, 1946 — 2 Sheets-Sheet 2
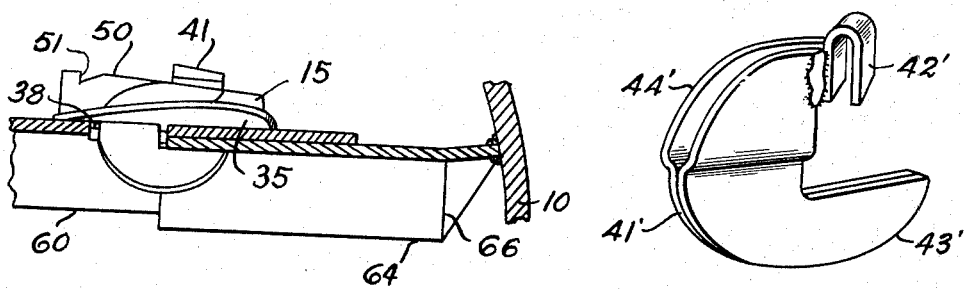
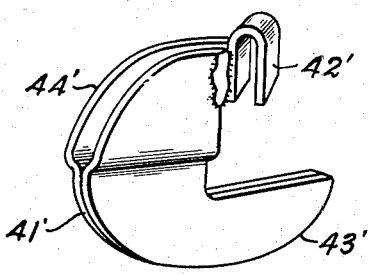
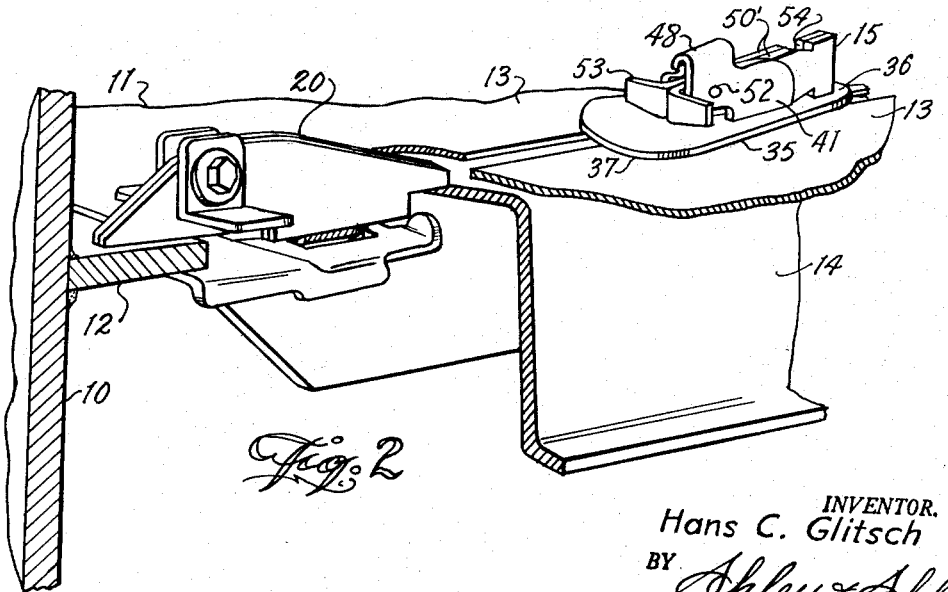
INVENTOR.
Hans C. Glitsch
BY Ahley & Ahley
ATTORNEYS Patented Feb. 6, 1951

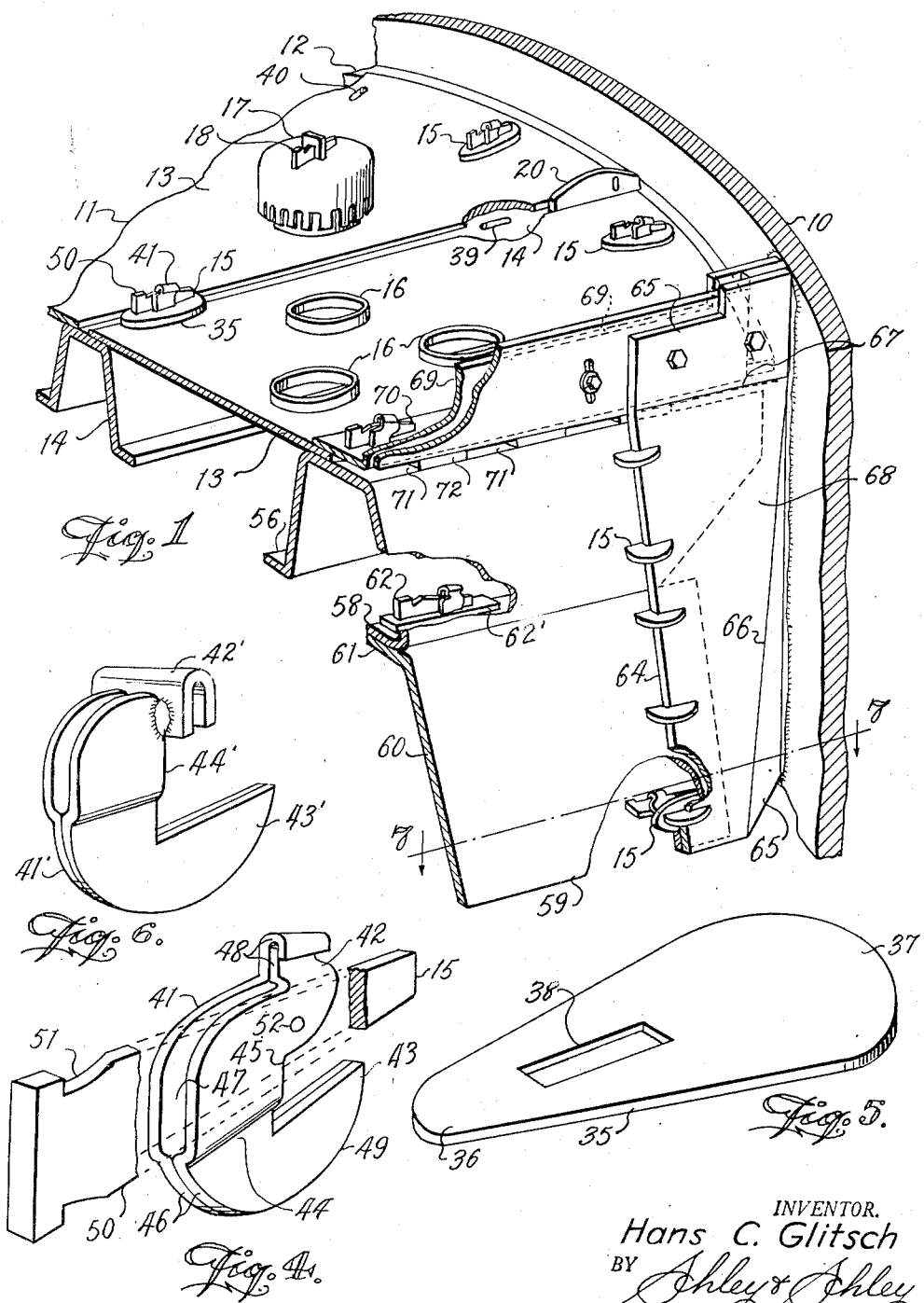

2,540,781

UNITED STATES PATENT OFFICE 2,540,781

WEDGE ACTUATED C CLAMP

Hans C. Glitsch, Dallas, Tex., assignor to Glitsch Engineering Company, Dallas, Tex., a partnership consisting of Fritz W. Glitsch, Jr., and Hans C. Glitsch Application September 20, 1946, Serial No. 698,143

4 Claims. (Cl. 24—243)

This invention relates to new and useful improvements in tray constructions for use in refining vessels and more particularly to fastening devices for use with refining vessel trays.

One object of the invention is to provide an improved tray construction for use in refining vessels having its downcomer and deck plates frictionally clamped in position in such a manner as to permit installation and removal of the same from above, thereby eliminating the necessity of entering below or between trays.

A particular object of the invention is to provide an improved fastening device particularly adapted for use in securing the downcomer plates and floor sheets of refining vessel trays and having coacting elements, one of which has a hook portion projecting through the other element and said sheets for engaging the opposite side of the latter, together with means for wedging said elements into snug frictional engagement with each other and said sheets so as to frictionally secure the latter together.

An important object of the invention is to provide an improved fastening device for frictionally securing members and having a clamping plate overlying the members with a hook passing through the plate, the hook having means for receiving a wedge element to draw said plate and hook into frictional clamping engagement with said members.

Another object of the invention is to provide an improved fastening device, of the character described, having means for preventing displacement of the wedge element so as to maintain the elements of the device in clamping relation.

A construction designed to carry out the invention will be hereinafter described, together with other features of the invention.

The invention will be more readily understood from a reading of the following specification and by reference to the accompanying drawings, wherein an example of the invention is shown, and wherein:

Fig. 1 is a perspective view of a portion of a tray assembly, constructed in accordance with the invention, and showing its relation to the wall of a refining vessel, Fig. 2 is a perspective view, partly in section, showing the mounting of the tray, Fig. 3 is a horizontal, cross-sectional view, taken on the line 3—3 of Fig. 1, Fig. 4 is a perspective view of the hook and wedge elements of one of the fastening devices, Fig. 5 is a perspective view of the clamping plate of the fastening device, Fig. 6 is a perspective view of a modified form of hook element, and Fig. 7 is a view, similar to Fig. 6, of another form of hook element.

In the drawings, the numeral 10 designates the cylindrical wall or shell of a refining vessel which has been illustrated as being of the bubble-tower type. The vessel may be of any desired diameter and height and only a portion of the same has been shown. A plurality of trays 11 extend transversely across the interior of the vessel at spaced intervals throughout the height thereof and the number of the trays is subject to variation in accordance with the size of said vessel and its use. Each tray 11 is supported within the vessel by a substantially annular, flat ring or support 12 which is secured to the internal surface of the wall 10, by welding or other suitable means, and projects radially inwardly from said wall as shown in Figs. 1 and 2. A plurality of deck plates or floor sheets 13, of stainless steel or other light-weight, corrosion-resistant material, are mounted upon transverse supports or beams 14 which extend across the interior of the vessel in substantially parallel relation. The floor sheets 13 are preferably of narrow width as compared to their lengths and are adapted to span the spaces between adjacent beams 14 with their longitudinal edge portions resting upon said beams and spaced a slight distance from each other. Each end or outer edge portion of each floor sheet is normally supported by the ring 12 and is spaced from the wall 10.

For frictionally clamping the edge portions of each sheet in such spaced relation to the beams and the ring, improved fastening devices 15 are provided and the construction of the same will be hereinafter described in detail. It is pointed out that movement of the sheets, due to thermal expansion and contraction, is permitted by the frictional clamping and spacing of said sheets. Suitable riser openings 16 may be formed in the floor sheets for receiving bubble cap assemblies 17 which are adapted to be secured in position by a fastening device 18 similar to the fastening devices 15.

The supports or beams 14 are of general trapezoidal shape, but may be of any desired construction, and have flat tops or upper surfaces upon which the marginal edge portions of the floor sheets rest. For supporting the beams and fastening the same to the ring 12, a hanger 20 is carried by each beam end and is adapted to frictionally secure the beam end to said ring.

As is most clearly shown in Figs. 2, 3 and 5, each fastening device 15 includes an elongate clamping plate or element 35 which is generally triangular or tear-shaped and has a rounded, reduced inner end 36 with an enlarged, semi-circular opposite or forward end 37. The clamping plate or element 35 is preferably formed of flat metal or sufficient thickness to withstand bending stresses. An elongate opening or slot 38 is formed in the plate along its central longitudinal axis with one end terminating adjacent the reduced end 36 of said plate, while its opposite end terminates at substantially the center of said plate. The plate is adapted to overlie the marginal edge portions of adjacent sheets with its slot 38 in substantial alinement with a similar slot 39 formed in the flat top of the beam 14 which supports said sheets (Fig. 1). When the fastening devices are employed to secure the sheets to the ring 12, similar slots 40 are formed in the marginal edge portions of said sheet adjacent said ring.

A substantially flat hook or latch element 41 is insertable through the slot 38 of the clamping plate 35 as well as the slots 39 and 40 and is preferably of general C-shape to provide an overhanging head or hanger portion 42 and an underlying bill portion 43 connected by an intermediate portion or shank 44 as is most clearly shown in Fig. 4. The overhanging head 42 and underlying bill 43 provide a recess 45 for receiving and coacting with the plate, beams and sheet margins adjacent the slots 38, 39 and 40, respectively. Although the hook 41 may be formed of one piece, it is preferable to employ two substantially complementary metallic sections or members 46 which are disposed in parallel relation and have their bill portions welded or otherwise secured together. The head and shank portions of the members 46 are spread or bent outwardly and upwardly to provide a slot or space 47 therebetween. Upstanding lugs 48 are formed on the upper end of the head portions of the members, with one of the lugs being of greater length and being bent over the other lug so as to connect the upper ends of said members and provide a top wall for the slot 47. The lower edge portion of the bill 43 is preferably curved as shown by the numeral 49 to facilitate insertion of said bill in the slot 38 which may thereby be of limited length. It is also desirable to curve the upper edge portion of the hook head 42. It is pointed out that the spreading of the members 46 is sufficient to cause the shank portion 44 of the hook to snugly engage the side walls of the slot 38 when the bill 43 is inserted therethrough.

The slot 47 of the hook is adapted to receive a flat, upright wedge element or locking key 50, similar to the key 30, which has its upper and lower surfaces tapered or inclined from one end to the other. Suitable notches or recesses 51 are formed in the upper and lower surfaces of the key 50 adjacent its larger end for facilitating removal thereof. For increasing the frictional engagement between the key and its slot 47, a suitable dimple 52 may be formed in the head portion of each member 46 so as to provide an inwardly-directed projection or tit for engaging the lateral surfaces of said key.

As has been hereinbefore set forth, the clamping plate 35 is adapted to overlie the sheets 13 with its slot 38 in substantial alinement or registration with the slots 39 of the beams 14 or the slots 40 of said sheets. The latch element or hook 41 is inserted through the alined slots whereby its bill 43 engages the underside of the beam or the ring 12 and whereby its recess 45 receives and accommodates the adjacent marginal edge portions of the clamping plate, floor sheet and beam or ring. It is pointed out that the hook is inserted in the slot in such manner that its head 42 is disposed in overlying engagement with the enlarged end portion 37 of the clamping plate. Due to the width of the slot 38, the spread shank portion of the hook has its lower portion engaging within said slot; however, the spreading of the shank portion is preferably sufficient to prevent the same from passing entirely through the slot whereby the head of the hook is spaced above the clamping plate. The key 50 is inserted in the slot 47 above and in engagement with the clamping plate with its reduced end overlying the enlarged end portion 37 of said plate. It is desirable to drive or otherwise force the key into snug frictional engagement with the walls of its slot and with the clamping plate, thereby drawing the hook upwardly with its bill 43 in snug engagement with the lowermost of the members being fastened. At the same time, the clamping plate is urged downwardly toward the bill of the hook whereby the members being fastened are frictionally fastened together. Due to the provision of the dimples 52, accidental dislodgment of the key is prevented.

Although the wedge element or key 50 of each fastening device is preferably formed of one piece of flat metal, it is sometimes desirable to form said key of a pair of complementary thin sections or members 50' which are welded or otherwise secured together. The sections 50' are formed of pliable or bendable metal and their reduced end portions, being unsecured, are adapted to bend outwardly upon themselves as shown by the numeral 53 to prevent displacement of the wedge element from its frictional engagement within the slot 47 of the hook 41. Notches or recesses 54, similar to the recesses 51, are formed in the element sections adjacent their larger ends to facilitate removal of said element.

In some installations, it is impossible for the key of the fastening device to extend longitudinally of its clamping plate 35 and hook 41 due to obstructions. As shown in Figs. 10 and 11, a hook 41' is provided with an upstanding shank 44' and has an inverted U-shaped hanger element 42' welded or otherwise secured to the forward edge of the shank for receiving a suitable key (not shown) similar to the key 50. The hanger element 42' overlies the inner portion of the bill 43' of the hook 41' and may extend at a right angle to the body of said hook (Fig. 6) or any other angle relative thereto (Fig. 7). Of course, the key is adapted to coact with a clamping plate similar to the plate 35.

In the conventional operation of refining vessels, liquids flow downwardly and gases flow upwardly. Communication between adjacent trays 11 is provided by an overflow channel or space between the vessel wall 10 and one of the outermost or end beams 56 as shown in Fig. 1.

Although the beam 56 is similar to the beam 14, its outermost leg is provided with an inwardly-directed flange 58. An inclined downcomer 59, preferably of the weir type, is supported by the beam 56 so as to extend substantially from one end of the ring 12 to the other end thereof. The downcomer 59 includes a coextensive, depending deflector plate 60 which is inclined toward the vessel wall to coact therewith in forming the overflow space. A lateral or inwardly-directed flange 61 is formed at the upper margin of the plate 60 so as to underlie the flange 58 of the downcomer beam 56 and these flanges are preferably secured together at spaced intervals by fastening devices 62 which are similar to the devices 15. As shown in Fig. 1, a rectangular plate 62' may be substituted for the tear-shaped clamping plate 35.

For supporting the vertical ends of the downcomer plate 60 and sealing off between said ends and the vessel wall, an angular, adapter 64 is provided at each end of said downcomer plate. The adapter 64 includes an upright, flat plate or body portion 65 which has its outer longitudinal edge welded or otherwise secured to the vessel wall in a substantially vertical plane. The inner, lower portion of the adapter plate 65 is bent upon itself along the lines 66 and 67 to provide an inclined, flat flange 68 (Figs. 1 and 3). A portion of the flange 68 overlies the outermost leg of the beam 56, as well as the vertical margin of the downcomer plate 60, and is frictionally secured to the same at spaced intervals by means of the fastening devices 15. Due to the construction of the adapter 64, an inclined downcomer may be supported within a cylindrical vessel with its ends sealed off from the wall of said vessel without the usual difficulty of forming elliptical curves.

The downcomer or effluent weir includes a suitable angle bar 69 which overlies and is frictionally clamped to the beam 56 by suitable fastening devices 70 (Fig. 1) which are similar to the fastening devices 15. It is pointed out that it is unnecessary to use clamping plates with the fastening devices 70, because the lower flange of the angle bar 69 functions in the same manner as said plates. To accommodate these fastening devices, the marginal edge portions of the floor sheet 13 which is confined between the angle bar and the downcomer beam has cutouts or recesses 71 formed therein as shown in Figs. 1 and 6. Due to the provision of the recesses 71, the floor sheet is provided with spaced fingers or tongues 72 for supporting the angle bar without the use of a plurality of shims.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. In combination with a clamping plate having a narrow opening therein, a fastening device including, a hook having a shank of thin cross-section insertable in the opening of the plate, a bill projecting transversely from one end of the shank so as to be insertable through the plate opening in underlying relation to the plate, a wedge-shaped key, and a hanger extending from the other end of said shank for receiving and holding the key in frictional engagement with the plate, the hanger overlying the plate in substantially parallel spaced relation, said shank being enlarged in cross-section adjacent said hanger so as to engage and close the plate opening.

2. A fastening device as set forth in claim 1 wherein the hanger extends transversely to the bill.

3. In combination with a clamping plate having an opening therein, a fastening device including, a hook having a shank of thin cross-section insertable in the opening of the plate, a bill of thin cross-section projecting laterally from one end of the shank so as to be insertable through the clamping plate opening in underlying relation to the clamping plate, a hanger carried by the opposite end of the shank, a wedge-shaped key adapted to be received by the hanger and to engage between the hanger and the clamping plate, said shank and bill being uniplanar, and said shank being enlarged in cross-section adjacent its medial portion to engage in and close the clamping plate opening.

4. In combination with a clamping plate having an opening therein, a fastening device including, a hook having a shank of thin cross-section insertable in the opening of the plate, a bill of thin cross-section projecting laterally from one end of the shank so as to be insertable through the clamping plate opening in underlying relation to the clamping plate, the upper portion of the shank having a greater cross-sectional thickness than the lower portion thereof so as to engage within and close the clamping plate opening, a hanger extending laterally from the upper end of the shank and being of a cross-sectional thickness comparable to the thickness of the upper portion of the shank, said upper portion of the shank and hanger being coplanar and having a coplanar slot therein, and a wedge-shaped key adapted to be received in said slot and to urge the clamping plate toward the bill of the hook.

HANS C. GLITSCH.

REFERENCES CITED

The following references are of record in the file of this patent:

UNITED STATES PATENTS

| Number | Name | Date |
|---|---|---|
| 166,022 | Mihills | July 27, 1875 |
| 334,873 | Knight | Jan. 26, 1886 |
| 386,631 | Garrison | July 24, 1888 |
| 685,253 | Caldwell | Oct. 29, 1901 |
| 750,595 | Campbell | Jan. 26, 1904 |
| 831,440 | Irvin | Sept. 18, 1906 |
| 923,610 | Wanamaker | June 1, 1909 |
| 1,027,632 | White | May 28, 1912 |
| 1,502,215 | Sohst | July 22, 1924 |
| 1,515,335 | Bosco | Nov. 11, 1924 |
| 1,582,095 | Symes et al. | Apr. 27, 1926 |
| 1,794,976 | Mueller | Mar. 3, 1931 |
| 2,210,808 | Glitsch | Aug. 6, 1940 |
| 2,309,309 | Glitsch | Jan. 26, 1943 |
| 2,341,091 | Glitsch | Feb. 8, 1944 |
| 2,375,409 | Glitsch | May 8, 1945 |
| 2,380,852 | Lambert et al. | July 31, 1945 |
| 2,420,075 | Glitsch | May 6, 1947 |